United States Patent
Matz

(10) Patent No.: US 7,769,894 B2
(45) Date of Patent: Aug. 3, 2010

(54) DETERMINING AND PRESENTING COMMUNICATION DEVICE PROXIMITY INFORMATION

(75) Inventor: William Matz, Atlanta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 532 days.

(21) Appl. No.: 11/549,288

(22) Filed: Oct. 13, 2006

(65) Prior Publication Data

US 2008/0195702 A1    Aug. 14, 2008

(51) Int. Cl.
G06F 15/16    (2006.01)
(52) U.S. Cl. ...................................... 709/245
(58) Field of Classification Search ................. 709/204, 709/245
See application file for complete search history.

(56) References Cited

U.S. PATENT DOCUMENTS

| | | | | |
|---|---|---|---|---|
| 6,347,095 B1* | 2/2002 | Tang et al. | | 370/469 |
| 6,647,269 B2* | 11/2003 | Hendrey et al. | | 455/456.3 |
| 6,665,712 B2* | 12/2003 | Pickup | | 709/219 |
| 6,834,195 B2* | 12/2004 | Brandenberg et al. | | 455/456.3 |
| 7,095,336 B2* | 8/2006 | Rodgers et al. | | 340/903 |
| 7,293,176 B2* | 11/2007 | Otway et al. | | 713/169 |
| 7,401,148 B2* | 7/2008 | Lewis | | 709/228 |
| 2003/0233636 A1* | 12/2003 | Crawford | | 717/130 |
| 2005/0043060 A1* | 2/2005 | Brandenberg et al. | | 455/558 |
| 2007/0078942 A1* | 4/2007 | Christfort et al. | | 709/217 |

OTHER PUBLICATIONS

Website article, Disney*mobile, Family Locator, dated Jan. 25, 2007 at http://www.disneymobile.go.com/disneymobile/browse.

* cited by examiner

*Primary Examiner*—Wing F Chan
*Assistant Examiner*—Tesfay Yohannes
(74) *Attorney, Agent, or Firm*—Hope Baldauff Hartman LLC

(57) ABSTRACT

A location and mapping application takes device information and produces location information for display on a communication-enabled computing device (e.g., a personal digital assistant or wireless phone). A current location of a wireless device may be provided with an announcement of an incoming call or message and may be in the form of a street address or a map. Location information for a wired (or fixed-location) device may be provided in the form of a map. Location information for nearby wireless and wired devices may also be provided. Location information may be updated for wireless devices that are moving.

17 Claims, 7 Drawing Sheets

DETERMINING AND PRESENTING COMMUNICATION DEVICE PROXIMITY INFORMATION

TECHNICAL FIELD

This application relates generally to communication devices. More particularly, this application relates to providing proximity information associated with communication devices.

BACKGROUND

Users of wireless phones, personal digital assistants (PDAs), computers, and other communication devices are able to get information about other similar devices when two devices are in contact. For example, a cell-phone user who receives an incoming call from another communications device may receive information about the caller in the form of Caller ID information, which may include identifying information such as a phone number and/or a name. This information may be useful to the cell-phone user, enabling them to, for example, decide whether to take the incoming call.

Sometimes, information identifying a device or a caller may not provide enough information to a user of a communication device. The user may wish to know more about the device or caller with which the user is in communication or that is simply nearby. For example, a father receiving an incoming call from his teenage daughter may wish to know her location, or know of other devices in her vicinity, such as the cell phones or home phones of her friends. Such information is not presently provided to a user of a communication device.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one embodiment described herein, a method provides proximity information associated with a device to a second device. The location of the device is determined and proximity information associated with the location is also determined. The proximity information is provided for output on the second device. According to various embodiments, the proximity information may include an address of the first device, a map of an area including the first device, or the nearest location of a third device.

According to another embodiment of the invention, a system provides proximity information associated with a communications device. The system receives identification of the communications device and receives a location associated with the communications device. The system determines proximity information associated with the location and sends the identification of the communications device and the proximity information to another communications device for output.

According to yet another embodiment of the invention, a computer-readable medium stores instructions, which when executed by a computer, cause the computer to receive the identification and location of a wireless communications device upon the initiation of communications between the wireless device and a second communications device. The location of a third device that is associated with the first wireless device is determined. Proximity information associated with the first wireless device is determined. This proximity information includes the location of the third device and a map of the area encompassing the first wireless device. A displayable version of the proximity information is prepared for display on the second device and is sent to the second device for display.

Other systems, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

DETAILED DESCRIPTION

Figure 1:
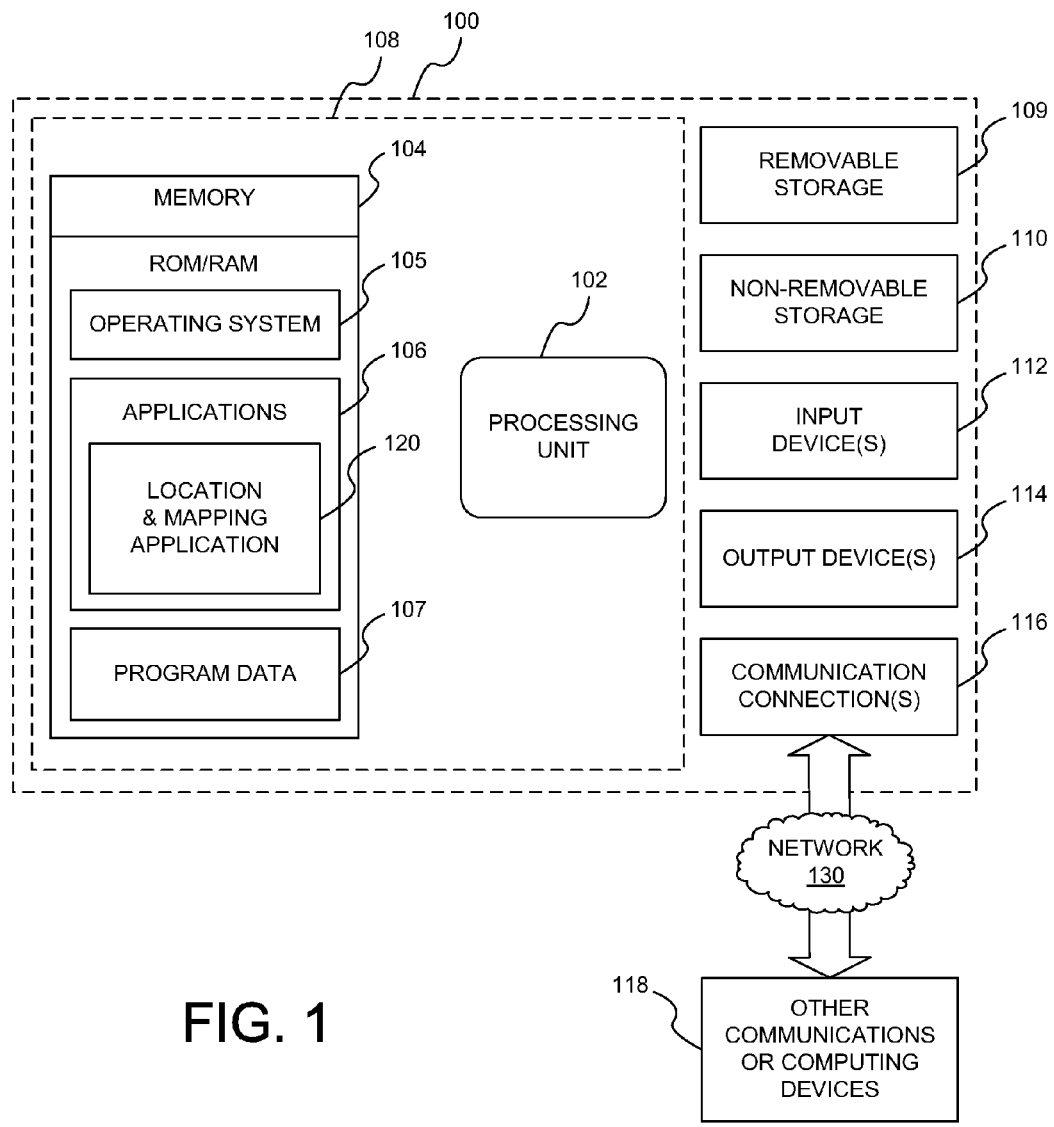
FIG. 1 is a block diagram illustrating an example of a computing device in which embodiments may be implemented.

The following detailed description is directed to methods and systems for presenting communications device proximity information to a communication-enabled computing device. In the following detailed description, references are made to the accompanying drawings that form a part hereof, and which are shown, by way of illustration, using specific embodiments or examples. Referring now to the drawings, in which like numerals represent like elements through the several figures, aspects of the methods and systems provided herein will be described.

FIG. 1 and the following discussion are intended to provide a brief, general description of a suitable computing environment in which embodiments of the invention may be implemented. While embodiments of the invention will be described in the general context of program modules that execute in conjunction with an application program that runs on an operating system on a computer system, those skilled in the art will recognize that other embodiments of the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a network. In a distributed computing environment, program modules may be located in both local and remote memory storage devices.

With reference to FIG. 1, embodiments of the invention may include a computing device, such as the computing device 100. In a basic configuration shown in FIG. 1, the computing device 100 includes at least one processing unit 102 and a memory 104. Multiple processors may accompany the processing unit 102. Depending on the configuration of the computing device 100, the memory 104 may be volatile (e.g., Random Access Memory (RAM)), non-volatile (e.g., Read-Only Memory (ROM), flash memory), or some combination thereof. The memory 104 serves as a storage location for an operating system 105, one or more applications 106, and may include program data 107, as well as other programs. In various embodiments, the applications 106 include a location and mapping application 120, an application including similar logic, or any other set of instructions comprising such logic. It should be noted that the logic of the location and mapping application 120 may be distributed and/or shared across multiple computing devices. More information regarding the function of the location and mapping application 120 is provided below in the description of FIGS. 2 and 3.

The computing device 100 may include additional features and functionality other than the features shown within dashed-line box 108. For example, the computing device 100 may include additional data storage components, including both removable storage 109 (e.g., floppy disks, memory cards, compact disc (CD) ROMs, digital video discs (DVDs), external hard drives, universal serial bus (USB) drives) and non-removable storage 110 (e.g., magnetic hard drives).

Computer readable media may include media implemented in any method or technology for storage of information, including computer readable instructions, data structures, program modules, or other data. The memory 104, the removable storage 109, and the non-removable storage 110 are all examples of computer storage media. Further examples of computer storage media include RAM, ROM, electrically-erasable programmable ROM (EEPROM), flash memory, CD-ROM, DVD, cassettes, magnetic tape, and magnetic disks. Any such computer storage media may be accessed by components which are a part of the computing device 100, or which are external to the computing device 100 and connected via a communications link (e.g., Bluetooth®, USB, parallel, serial, infrared). The computing device 100 may also include input devices 112 for accepting user input. Examples of input devices 112 include a keyboard, mouse, digitizing pen, microphone, touchpad, touch-display, and combinations thereof. Similarly, the computing device 100 may include output devices 114 such as displays, speakers, printers, and combinations thereof. It should be understood that the computing device 100 may also include additional forms of storage, input, and output devices. The input devices 112 and the output devices 114 may include communication ports and associated hardware for communicating with external input and output devices rather than including the devices with the computing device 100.

Computing device 100 may also include one or more communication connections 116 that include hardware and/or software which enable the computing device 100 to communicate with other communications or computing devices 118 over a network 130. The network 130 may include a wireless network such as, but not limited to, a Wireless Local Area Network (WLAN) such as a WiFi network, a Wireless Wide Area Network (WWAN), a Wireless Personal Area Network (WPAN) such as Bluetooth®, a Wireless Metropolitan Area Network (WMAN) such as a WiMAX network, a cellular network, or a satellite network. Alternatively, the network 130 may be a wired network such as, but not limited to, a wired Wide Area Network (WAN), a wired (Local Area Network) LAN such as the Ethernet, a wired Personal Area Network (PAN), or a wired Metropolitan Area Network (MAN). Communication media, in the form of computer readable instructions, data structures, program modules, or other data in a modulated data signal, may be shared with and by the computing device 100 via the communication connection 116. Modulated data signal may mean a signal that has one or more of its characteristics set or changed in such a manner as to encode information in the signal, and may include a modulated carrier wave or other transport mechanism.

Figure 2:
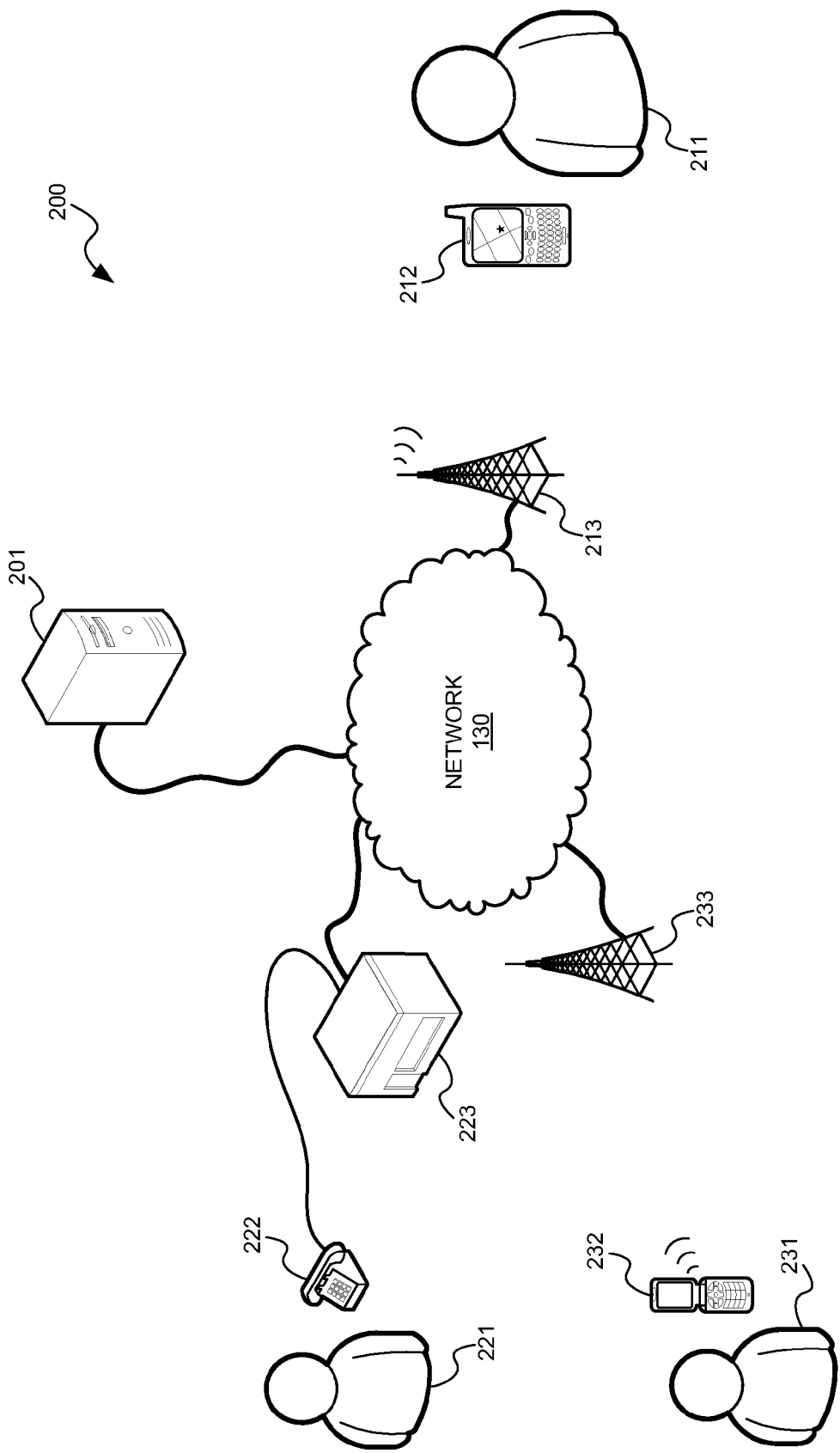
FIG. 2 depicts an example of a communications and proximity information delivery system according to one or more embodiments described herein.

Turning now to FIG. 2, a communications and proximity information delivery system 200, according to one or more embodiments will be described. The communications and proximity information delivery system 200 allows for a user 211 of a communication-enabled computing device 212 to communicate with and receive proximity information related to other communication devices 222 and 232 via the network 130 and a computing device 100. A server is one embodiment of the computing device 100 capable of storing and executing the location and mapping application 120. Although depicted as a single computing device 100, it should be appreciated that computing device 100 may be comprised of multiple computing devices working either independently or in concert with each other. The computing device 100 is connected to the network 130 via a wired or wireless connection. The network 130 may include one or more open or closed networks, including a telecommunications network, the Internet, or any network for transmitting and distributing voice and/or data communications, such as those described above. The network 130 may also include additional transmission, reception, and/or concentration points, including satellite receivers, modulators, routers, concentrators, multiplexers, and gateways.

A remote user 221 may contact other users 211 and 231 and devices 212 and 232 using the device 222, which in this example is a landline communications device, via a central office 223 which is connected to the network 130. The device 232, which in this example is a wireless communications device, is connected to the network 130 via a transceiver 233, such as a cell tower. The transceiver 233 enables wireless communications using electromagnetic frequencies or other wireless transmission methods. A remote user 231 may use the wireless communications device 232 to communicate with other users 211 and 221 and devices 212 and 222 via the network 130. The user 211 may utilize the communication-enabled computing device 212 to communicate with other users via wireless communication using a transceiver 213 which is also connected to the network 130. It should be appreciated that communication-enabled computing device 212 may be the computing device 100, as described above. It should also be appreciated that communication-enabled computing device 212 may be a PDA, a Smartphone, a wireless phone, a mobile computer, a laptop computer, or any computing device 100 which can communicate with other communication devices over a wired or wireless network such as the network 130.

According to one implementation described herein, when user 211 receives an incoming call from the remote user 221 or 231, the communication-enabled computing device 212 receives proximity information for presentation to user 211. As described herein, the proximity information is any information related to the actual geographic location of a communications device 222 or 232 with which the communication-enabled computing device 212 is in communication, or which is located in the vicinity of the communication-enabled computing device 212. As will be described in detail below, the proximity information, provided by the location and mapping application 120 on computing device 100, may be in the form of a map of the incoming caller's location, a street address of the incoming caller's location, a nearest intersection, a zip code, a city, and/or the location and/or contact information of a nearest communications device. In determining proximity information for the communication devices 222 or 232, the location and mapping application 120 determines a geographic location of a device 222 or 232 based on information received from the device itself, from elements of the network 130, and/or from a database including geographic locations of devices. For example, communications devices, such as the wireless device 232, may contain a Global Positioning System (GPS) receiver in order to receive location information from a GPS satellite network. The communications device 232 may determine its geographic location utilizing the GPS receiver, and transmit geographic coordinates to computing device 100, or to a separate location for storage and later retrieval, such as a database.

Alternatively, the geographic location of the communications device may be determined utilizing the known locations of transceivers, such as the transceiver 233. By determining the signal strength of the communications device 232 at multiple transceivers, the location of the communications device 232 may be determined via triangulation techniques. Likewise, the communications device 232 may measure the transmission strength of multiple nearby transceivers and triangulate its own location accordingly. This method of location determination may be combined with GPS technology to ensure the consistent collection of geographic location information and to provide redundant location determination systems. Location information from any number of communication devices may be stored in a database associated with the computing device 100 and be continually updated by the device 100, allowing the locations of the communications devices to be tracked. Other methods for determination of the geographic location of a communications device are available.

Once a geographic location for a communications device is determined, the location and mapping application 120 determines proximity information for the communications device. The type and format of the proximity information to be delivered to the communication-enabled computing device 212 may be determined by a service provider according to operational capabilities of the location and mapping application 120, the communication-enabled computing device 212, a fee-based subscription of the user 211, user preferences defined by the user 211 and stored in a profile database, or any combination thereof. If proximity information includes a map of the area surrounding the geographic location, the location and mapping application may create a map of the area, modifying existing maps or generating a new map based on information in a geographic database. Alternatively, a map may be generated by a separate application or computing device 100.

If proximity information includes information about a nearest communications device, then information may be retrieved by the computing device 100 from databases including information about devices. Additional details regarding the determination of proximity information, including determination of a nearest communications device, are provided below with respect to FIGS. 3-6.

Once received from the location and mapping application 120, the communication-enabled computing device 212 may display proximity information on a screen associated with the communication-enabled computing device 212. Examples of displayed proximity information are provided below with respect to FIGS. 8-12. Proximity information may additionally or alternatively be announced audibly at the communication-enabled computing device 212, such as the street address of the incoming caller. Proximity information may be displayed for the duration of the call, or alternatively may be displayed prior to acknowledging receipt of an incoming call. Proximity information provided by the location and mapping application 120 need not only be associated with an incoming call to the communication-enabled computing device 212. Proximity information may be provided by the location and mapping application 120 at other times, such as on command during the course of any communication (e.g., email, short message service (SMS), or during a call). User 211 may configure the communication-enabled computing device 212 to display one form of proximity information for a period of time, for example, and then display other forms of proximity information. For example, a user may view a map of a remote device's location for a period of time, and then view information identifying other nearby communication devices. Alternatively, the user 211 may wish to receive location and/or identifying information for the nearest communications device without initiating a communication, whether the nearest communications device is a landline phone, such as communications device 222, located in a nearby home or apartment, or the wireless phone, such as communications device 232, of a nearby individual.

The provision of proximity information to the communication-enabled computing device 212 may be subject to permissions set up on behalf of the user 211 as well as the remote users 221 and 231. For example, the user 211 may have previously opted to only receive proximity information for family members of the user 211, or for all individuals listed in the address book of the user 211. Likewise, the remote users 221 and 231 may have opted to block such information about them from being delivered, either on a user-by-user basis, or for all users. It is also possible that the user 211, given the authority to do so, may be able to override such a block and still receive such location information. This may be the case where the user 211 is a parent wanting to know the location of the remote user 221, who is a child of user 211. The remote user 221 may attempt to block sending proximity information, but the user 211 may override this block with authorization.

Figure 3:
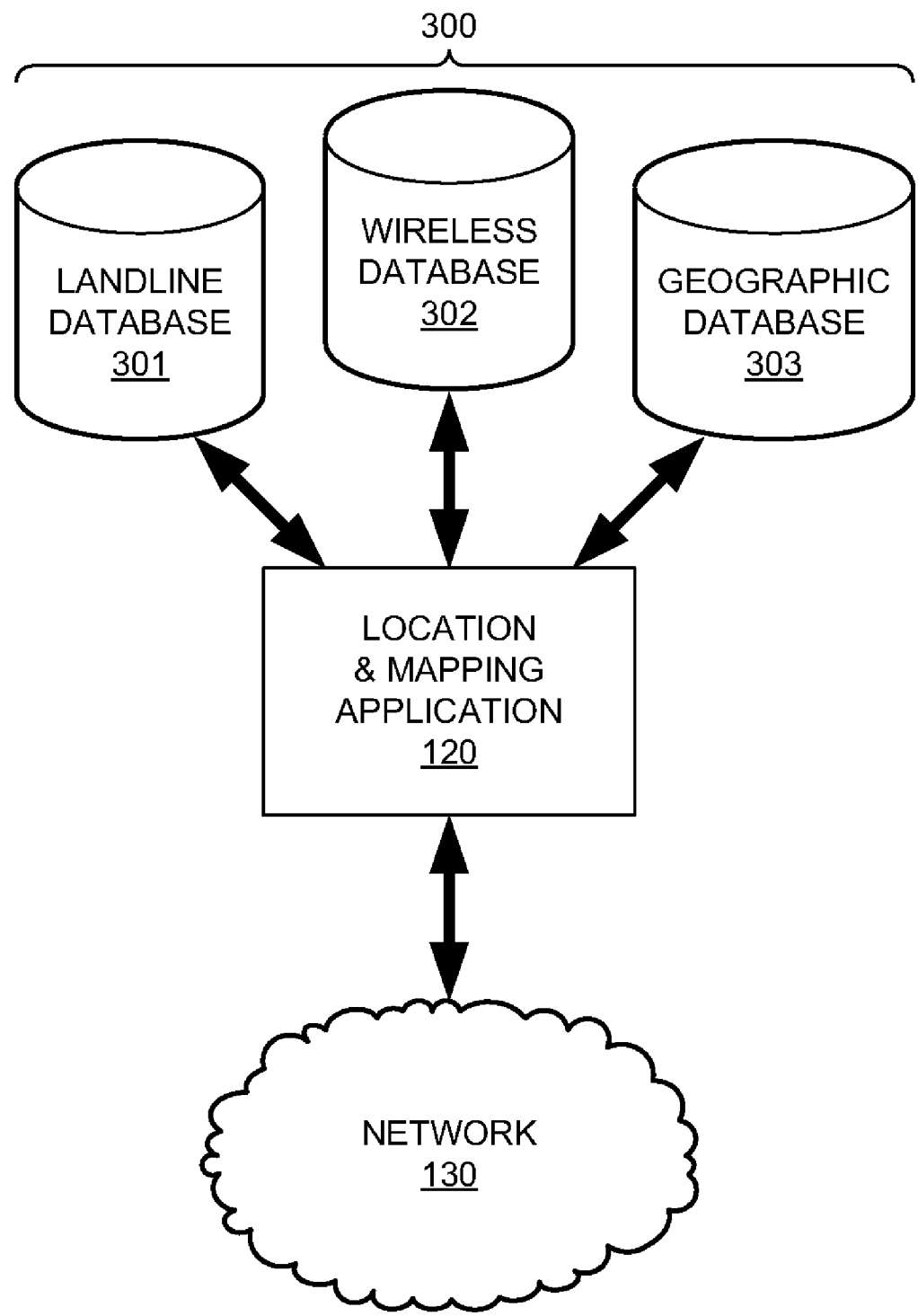
FIG. 3 depicts functional details for embodiments of a location and mapping application according to one or more embodiments described herein.

FIG. 3 depicts additional details about the functioning of embodiments of the location and mapping application 120. It should be appreciated that the embodiment depicted here is intended as an example and is not intended to limit other alternative embodiments. The location and mapping application 120 may work in conjunction with various databases 300 when supplying proximity information to the communication-enabled computing device 212. The various databases 300 may include a landline database 301, which may supply information associated with subscribers to wired phone services. The various databases 300 may also include a wireless database 302, which may supply information associated with subscribers to wireless phone services. The landline database 301 and the wireless database 302 may be integrated into a single subscriber database, and may include subscribers to other services, such as Internet services, cable television services, utility services, and other services and products. It should be understood that the various databases 300 may be populated with contact information relating to businesses, residences, and cellular customers according to subscriptions allowing this contact information to be freely disseminated to subscribers of the databases 300 with all listed public contact information requiring permission by users 221 and 231 prior to distributing their contact information. The various databases 300 also include a geographic database 303, which may supply information on geographic features (e.g., roads, rivers, schools) and/or supply information for converting geographic coordinates (e.g., longitude and latitude) into street addresses and other more-readable formats. The databases 300 may include one or more other databases which may assist in identifying, locating, and/or mapping the locations of communications devices.

Figure 4:
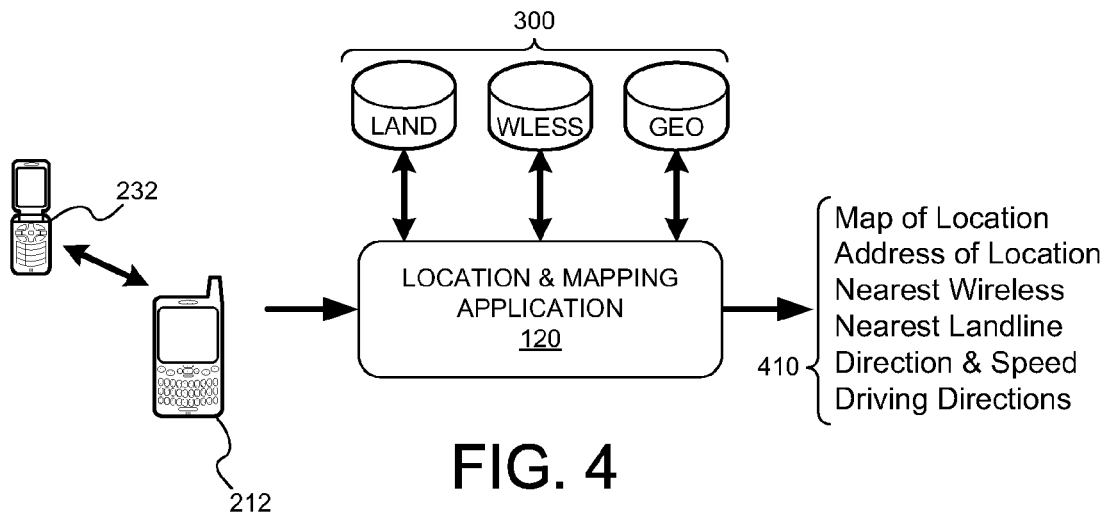
FIG. 4 depicts examples of inputs and outputs associated with providing proximity information for a wireless communications device according to one or more embodiments described herein.
Figure 5:
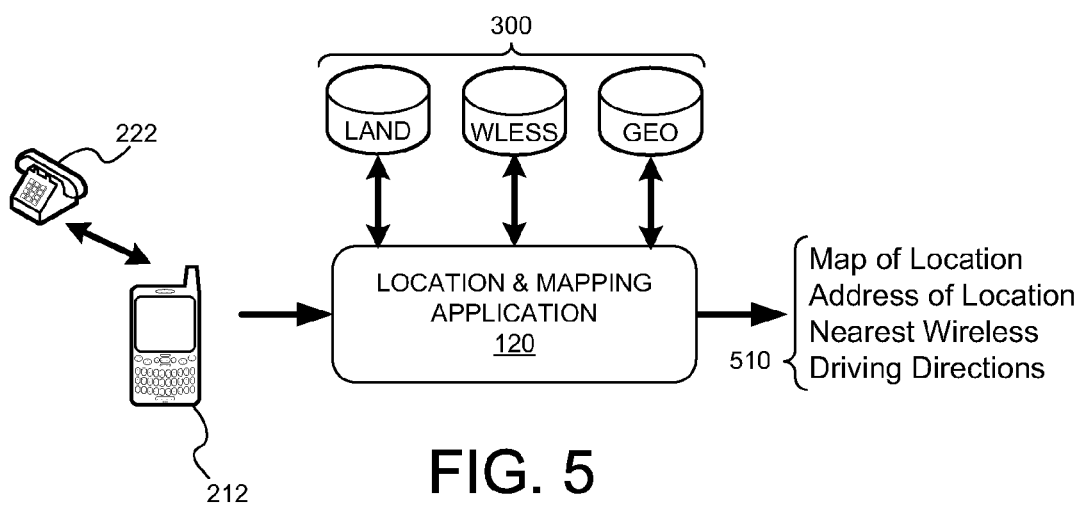
FIG. 5 depicts examples of inputs and outputs associated with providing proximity information for a wired communications device according to one or more embodiments described herein.
Figure 6:
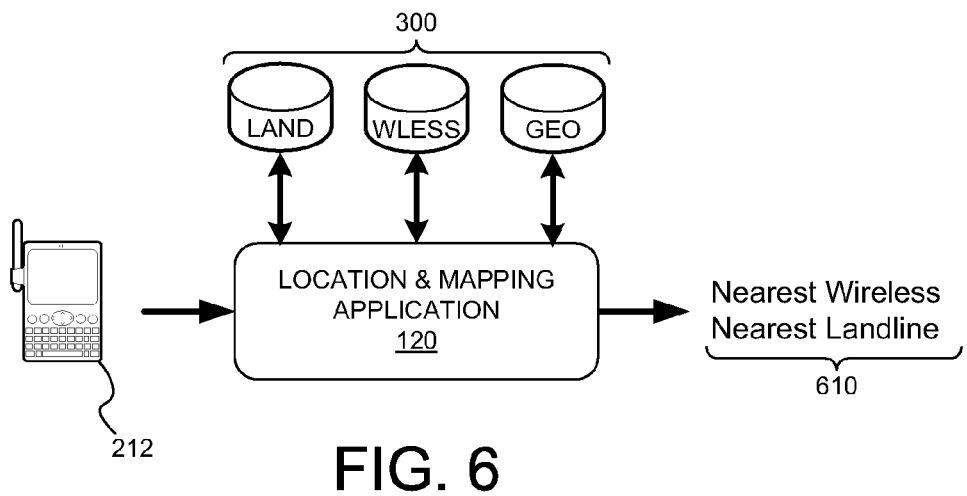
FIG. 6 depicts examples of inputs and outputs associated with providing nearest communications device information according to one or more embodiments described herein.

FIGS. 4-6 depict examples of inputs that may be consumed and examples of outputs that may be produced by the location and mapping application 120. FIG. 4 depicts examples of inputs and outputs associated with providing location information for the wireless communications device 232. In this example, the communication-enabled computing device 212 receives an incoming call from the wireless communications device 232. Either during routing of the call, or once the call has been routed, the device 212 requests proximity information from the location and mapping application 120. The request may include identifying information about the wireless communications device 232. The request may also include geographic coordinates of the present location of the wireless communications device 232. Such coordinate information may be determined by the wireless communications device 232 itself and/or may be determined with the assistance of external devices, as described above. The location and mapping application 120 uses the identifying information and any location information as inputs for generating one or more of the desired outputs 410.

In the course of generating one or more of the outputs, the location and mapping application 120 may query the databases 300 to, for example, look up identifying information of a nearest wired telephone subscriber, look up identifying information of a nearest wireless telephone subscriber, and acquire geographic information so as to generate a map of the location of the wireless communications device 232. If determining a direction and speed for the wireless user 231, the location and mapping application 120 may request regular location updates for the wireless communications device 232 so as to be able to measure the location change over time and calculate direction and speed. Direction and speed may also be determined by the wireless communications device 232 itself and passed to the location and mapping application 120 as a part of the initial request. Driving directions to the present location of the wireless communications device 232 may be generated by the location and mapping application 120 which may also produce a map showing a highlighted route, as well as textual directions. Driving directions may be determined with the assistance of geographic database 303, or with assistance from other applications or services, such as the mapping services provided by YAHOO!, GOOGLE, and MAPQUEST.

When outputs 410 include proximity information which includes information on nearest communications devices, the location and mapping application 120 may query one or more of the databases 300. In the case of a nearest landline phone, the location and mapping application 120 may take the geographic location of the wireless communications device 232, for example, and query a database of landline subscribers 301 searching for the closest wired phone. Once determined, information about the closest wired phone, including customer name, address, and phone number is retrieved by the location and mapping application 120, subject to any permissions the subscriber may have put in place. Permissions may also be determined using a query of a customer profile database, for example. In the case of a nearest wireless device, the location and mapping application 120 may take the geographic location of the wireless communications device 232, and query a database 302 of wireless subscribers. The database 302 may include a most recent location of all wireless devices that is updated regularly, again subject to any customer permissions. Once a nearest wireless device is determined, and any permissions are checked, information about the nearest device may be retrieved by the location and mapping application 120, including a customer name, phone number, as well as a geographic location.

FIG. 5 depicts examples of inputs and outputs associated with the location and mapping application 120 providing location information for the wired communications device 222. In this example, the communication-enabled computing device 212 receives an incoming call from the wired communications device 222. Either during routing of the call, or once the call has been routed, the device 212 requests proximity information from the location and mapping application 120. The request includes identifying information about the wired communications device 222. The identifying information is used by the location and mapping application 120 to query the databases 300 in order to determine an address associated with the location of the wired communications device 222. Once known, the location and mapping application 120 may query the geographic database 303 in order to assemble a map of the location of the incoming call. Other outputs 510 may include information identifying a nearest wireless device, as well as driving directions from the current location of communication-enabled computing device 212. These outputs may be generated in much the same fashion as discussed above with regard to FIG. 4.

FIG. 6 depicts examples of inputs and outputs associated with the location and mapping application 120 providing nearest customer information for a communication-enabled computing device 212. In this example, the current location of the communication-enabled computing device 212 is known and may be sent in a request from the device 212 to the location and mapping application 120. The location information is utilized by the location and mapping application 120 to query the appropriate databases 300 for determining proximity information, such as a nearest communications device. The outputs 610 from the location and mapping application 120 may be sent back to the communication-enabled computing device 212 in the form of text or as a map which can then be utilized by user 211 to view the nearest subscribers or customers within a particular distance. In various embodiments, the communication-enabled computing device 212 may include functionality similar or identical to the location and mapping application 120, rather than utilize a separate computing device 100 connected to the network 130. Regardless of where the location and mapping application 120 is executing, embodiments of the location and mapping application 120 will query databases 300 either remotely over the network 130 or locally on the same system.

Figure 7:
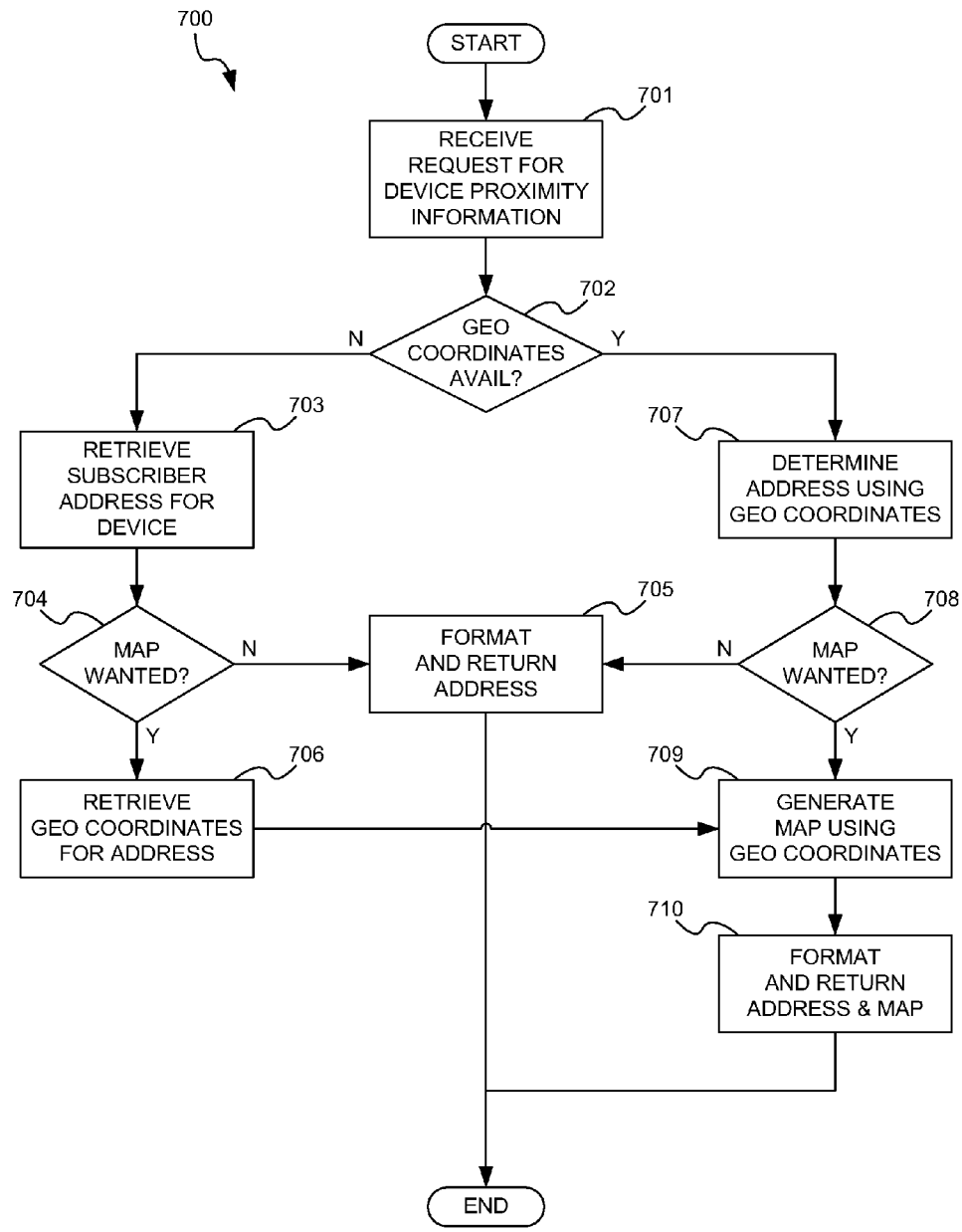
FIG. 7 depicts an example of a process for providing location information about a communications device according to one or more embodiments described herein.

FIG. 7 depicts an example of a process 700 by the location and mapping application 120 for providing proximity information about the communications device 232. Such a process may be implemented on one or more computing devices 100, and may include the functionality of the location and mapping application 120. The logical operations of the various implementations presented, may be (1) a sequence of computer implemented acts or program modules running on one or more computers 100 and/or (2) interconnected machine logic circuits or circuit modules within the computing device 100. The implementation is a matter of choice dependent on the performance requirements of the computing devices 100 on which the embodiments are implemented. Accordingly, the functional operations making up the implementations are referred to variously as operations, structural devices, acts, or modules. It will be recognized by one skilled in the art that these operations, structure devices, acts, and modules may be implemented in software, in firmware, in special purpose digital logic, and/or any combination thereof without deviating from the spirit and scope of the attached claims. Moreover, it will be apparent to those skilled in the art that the operations described may be combined, divided, reordered, skipped, and otherwise modified, also without deviating from the spirit and scope of the attached claims.

For the purposes of this illustration, FIGS. 7-12 will be described with respect to communication device 232. It should be understood that the process 700 is equally applicable to communications device 222 or any other communication device connected to the network 130. At operation 701, the location and mapping application 120 receives a request for proximity information for the communications device 232. The request may be initiated by the communications device 232, by the communication-enabled computing device 212, or by any device connected through the network 130. The request may include identifying information for the communications device 232 and/or geographic coordinates for the present location of the communications device 232. At decision 702, the location and mapping application 120 determines whether geographic coordinates are available. If no geographic coordinates are available (e.g., the communication device 232 is not equipped with GPS technology or is a wired phone without GPS), then at operation 703, the location and mapping application 120 uses the identifying information to look up an address associated with the communications device 232. At decision 704, the location and mapping application 120 determines whether a map is necessary. If no map is needed (e.g., the display on the communication-enabled computing device does not support graphical maps), then at operation 705, the location and mapping application 120 formats the address associated with the communications device 232 appropriately (e.g., text and/or audio) and returns the formatted address. If at decision 704, a map is desired, then at operation 706 the location and mapping application 120 performs a query to assist with converting the located address into a geographic location (e.g., a street address is converted into longitude and latitude). This information is used by the location and mapping application 120 to generate a map at operation 709, described in more detail below.

Returning to decision 702, if geographic coordinates are available for the communications device 232 (e.g., the wireless device 232 has a GPS receiver), then at operation 707, the location and mapping application 120 determines an address using the geographic coordinates. This may be the result of a query similar to the one described with respect to operation 705. If, at decision 708, no map is desired, then the location and mapping application 120 returns the address determined in operation 707 for textual or audible output on the communication-enabled computing device 212. If a map is desired, then at operation 709, the location and mapping application 120 assembles a map including the location information (e.g., communications device 232 location, communication-enabled computing device 212 location, other relevant locations). The map may be generated by the location and mapping application 120 by taking existing graphical maps and superimposing or overlaying location information where appropriate. Also, unadorned maps may be sent from the location and mapping application 120 to the communication-enabled computing device 212 along with proximity information, including items having locations for display on the map. The map may be sized appropriately by the location and mapping application 120 based on the resolution of a display associated with communication-enabled computing device 212. If the map is to be used to provide driving directions, then the map may be modified by the location and mapping application 120 to include a highlighted route, or the information may be passed to the communication-enabled computing device 212 for display. At operation 710, the location and mapping application 120 responds to the initial request with map and addresses for all relevant locations. If needed, addresses may be formatted in an audible format. If direction and speed are to be continually plotted on the map, then subsequent location updates may be sent by the location and mapping application 120 to the communication-enabled computing device 212.

Figure 8:
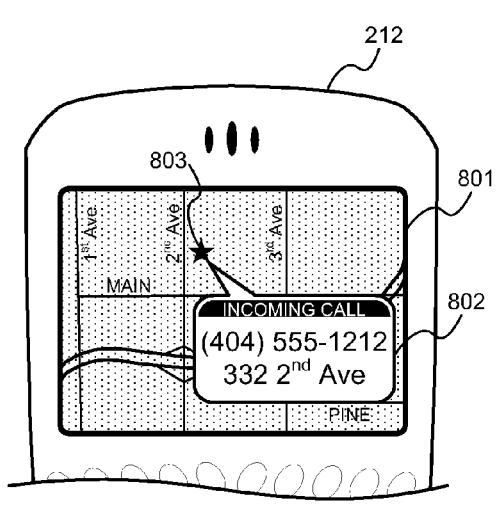
FIGS. 8-12 each depict an example of a display of location information on a communication-enabled computing device according to one or more embodiments described herein.
Figure 9:
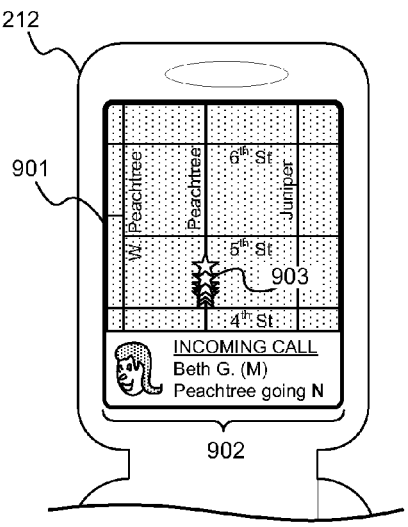
Figure 10:
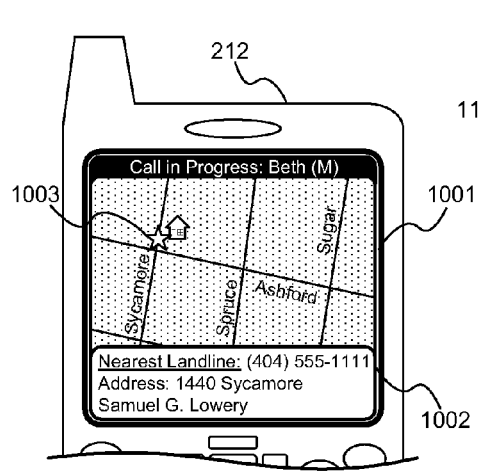
Figure 11:
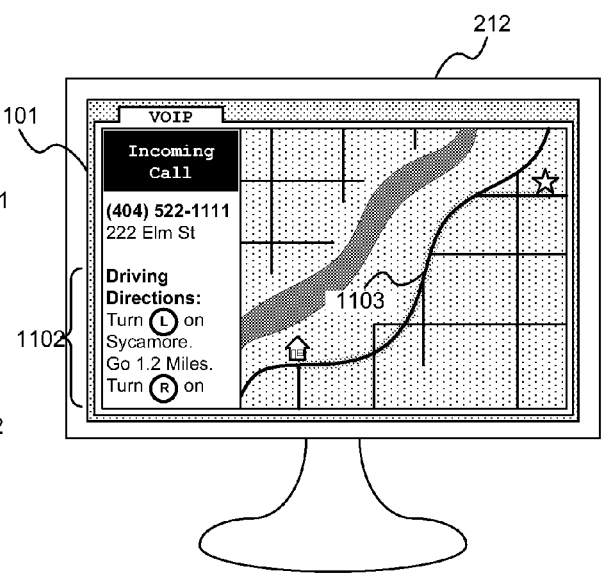

FIGS. 8-12 depict examples of the geographic information provided by the location and mapping application 120. In each figure, an embodiment of the communication-enabled computing device 212 displays information about the location of a communications device 232. FIGS. 8, 9, and 11 particularly depict the display of geographic information associated with the device of an incoming caller. This collection of displays is not intended to limit embodiments as only being used with incoming communications. The user 211 of the communication-enabled computing device 212 may request this information on demand, retrieving, for example, a map of the location of a child's cell phone without communicating with the child.

FIG. 8 depicts a display 801 associated with an incoming caller on the communication-enabled computing device 212. The display 801 includes a map showing the location 803 of the caller, overlaid with additional caller information 802. The map is supplied by the location and mapping application 120 along with the street address displayed in the caller information 802. The address depicted may be the result of a caller identification lookup performed by the location and mapping application 120, the caller being associated with a street address. The address depicted may also be the result of the location and mapping application 120 receiving geographic coordinates (e.g., longitude and latitude values) associated with the current location of incoming caller and converting the coordinates to a street address using geographic database 303.

FIG. 9 depicts a display 901 associated with an incoming caller on the communication-enabled computing device 212. The display 901 includes a map showing the location 903 of the caller, along with additional caller information 902. The map is again supplied by the location and mapping application 120 along with the direction of travel displayed in the caller information 902. Here, the map is updated showing the location 903 of the caller as it changes over time. Although not shown, the location and mapping application 120 may also supply an associated speed of travel for the caller.

FIG. 10 depicts a display 1001 associated with a call in progress on the communication-enabled computing device 212. The display 1001 includes a map showing the location 1003 of the caller, along with additional caller information 1002. The map is supplied by the location and mapping application 120 along with the nearest landline information displayed as part of caller information 1002. The location and mapping application 120 determines the nearest wired subscriber using information stored in landline database 301 and geographic database 303. Although not shown, the location and mapping application 120 may also use information stored in the wireless database 302 to determine a closest wireless subscriber. Such information may be useful to, for example, determine whose home a user's daughter is at, or which friends she is currently with.

FIG. 11 depicts a display 1101 associated with an incoming call on the communication-enabled computing device 212. In this example, unlike the devices of previous figures, the communication-enabled computing device 212 is a computer acting as a communication-enabled device. In this case, the computer is using Voice over Internet Protocol (VOIP) technology to transmit voice communications. As with previous examples, the map shown on display 1101 is supplied by the location and mapping application 120. The location and mapping application 120 also provides textual driving directions 1102 which accompany a highlighted route 1103 on the map. The highlighted route 1103 and the driving directions 1102 may be determined by the location and mapping application 120 using information stored in geographic database 303. The starting address and ending address for driving directions 1102 may be determined in a fashion using subscriber databases 301 and 302 in conjunction with geographic database 303.

Figure 12:
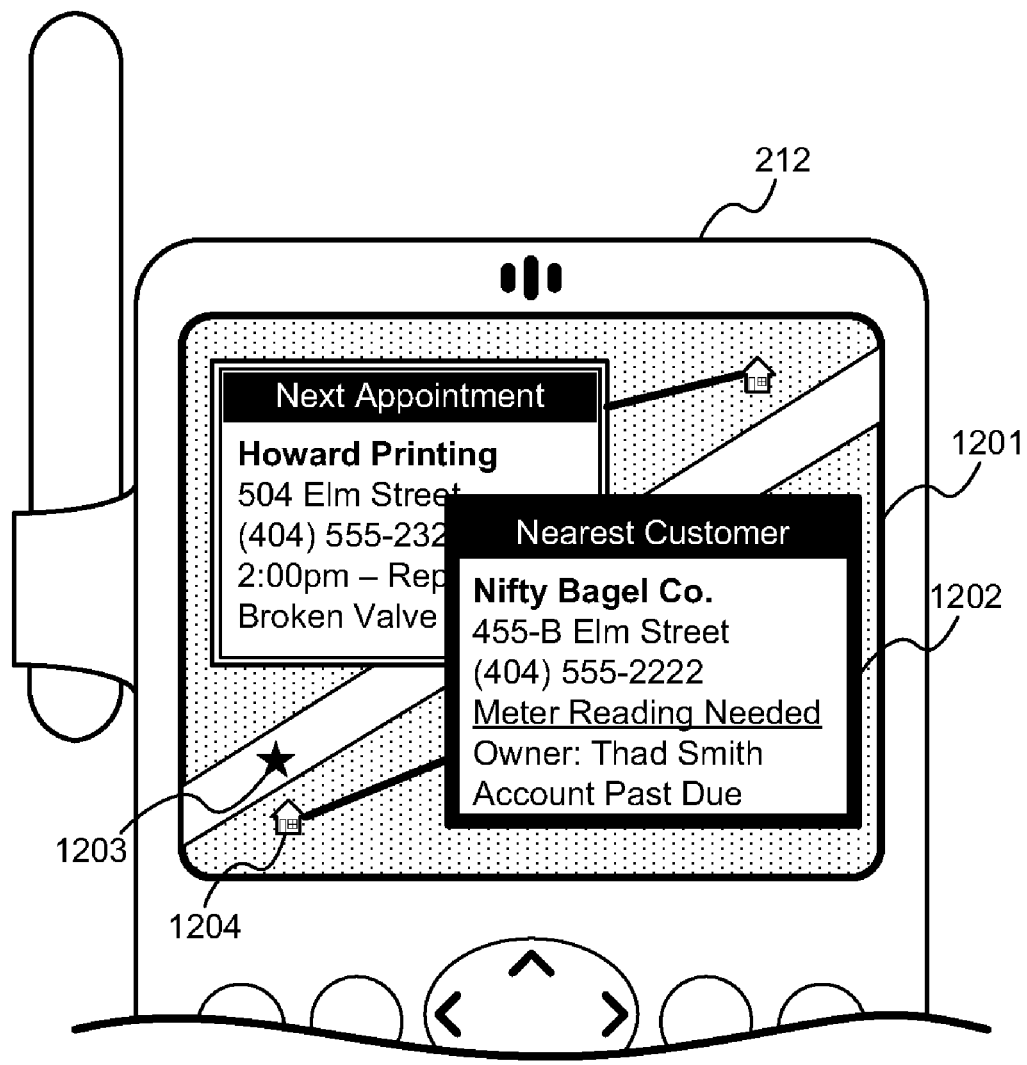

FIG. 12 depicts a display 1201 associated with the current location of the communication-enabled computing device 212. This example does not require a communication with another device. Instead, the mobile computer depicted here displays the location 1204 of the subscriber or customer nearest the mobile computer's current location 1203. Such an application may be utilized by a repair man or other authorized individual attempting to discern identifying information about nearby customers and/or subscribers. Additional information 1202 about the customer or subscriber is also provided. The map shown on the display 1201 may be updated as the mobile computer moves, showing additional subscribers or customers within a particular range (e.g., 100 feet). Although no other device is in communication with the mobile computer, nevertheless the location and mapping application 120 is utilized to provide location information based on the current location of the mobile computer.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing proximity information associated with a first communications device, the method comprising:
   during routing of a call from the first communications device to a second communications device, receiving a request from the second communications device for the proximity information associated with the first communications device; and
   in response to the request:
      determining a location of the first communications device,
      determining a location of a third communications device located nearest the first communications device, and
      providing the location of the first communications device, the location of the third communications device, and information identifying a user associated with the third communications device to the second communications device.

2. The method of claim 1, wherein the second communications device comprises a communication-enabled computing device.

3. The method of claim 2, wherein providing the location of the first communications device comprises providing an audible announcement of an address associated with the first communications device to the communication-enabled computing device.

4. The method of claim 1, wherein determining the location of the first communications device comprises determining geographic coordinates associated with the location of the first communications device.

5. The method of claim 1, wherein determining the location of the first communications device comprises determining an address associated with the location of the first communications device.

6. The method of claim 1, further comprising generating a graphical map of an area near the location of the first communications device.

7. The method of claim 6, further comprising providing the graphical map to the second communications device for visual display.

8. The method of claim 1, further comprising providing a phone number of the third communications device to the second communications device.

9. The method of claim 1, further comprising providing driving directions from a location of the second communications device to the location of the first communications device.

10. A system for providing proximity information associated with a first communications device, comprising:
    memory for storing a program containing code for providing proximity information associated with a first communications device; and
    a processor functionally coupled to the memory, the processor being responsive to computer-executable instructions contained in the program and configured to:
       receive a request from a second communications device for the proximity information associated with the first communications device during routing of a call from the first communications device to the second communications device, and
       in response to the request:
          determine a location of the first communications device,
          determine a location of a third communications device located nearest the first communications device, and
          provide the location of the first communications device, the location of the third communications device, and information identifying a user associated with the third communications device to the second communications device.

11. The system of claim 10, wherein the process is further configured to determine an address associated with the first communications device.

12. The system of claim 11, wherein the processor is configured to query a customer database to determine an address associated with the first communications device.

13. The system of claim 10, wherein the processor is further configured to generate a graphical map of the location of the first communications device.

14. The system of claim 10, wherein the processor is further configured to receive caller ID information from the first communications device.

15. The system of claim 10, wherein the processor is further configured to:
  generate a map of a geography surrounding the first communications device; and
  add the location of the third communications device to the map of the geography surrounding the first communications device.

16. The system of claim 10, wherein the processor is further configured to provide driving directions between the location of the first communications device and a location of the second communications device.

17. A computer-readable storage medium storing computer-executable instructions, which when executed by a computer, perform a method comprising:
  receiving a device identifier and a location identifier associated with a first wireless communications device upon initiation of a communication between the first wireless communications device and a second communications device;
  determining a location identifier of a third communications device associated with the first communications device, wherein the third communications device is located nearest to the first communications device;
  determining proximity information associated with the location identifier of the first communications device, wherein the proximity information comprises:
    the location identifier of the third communications device associated with the first communications device, and
    a map of a geographic area encompassing a geographic location associated with the location identifier of the first communications device;
  preparing a displayable version of the proximity information for output on a display of the second communications device; and
  sending the displayable version of the proximity information to the second communications device.

* * * * *